United States Patent
Drori et al.

(10) Patent No.: US 7,523,351 B2
(45) Date of Patent: Apr. 21, 2009

(54) SYSTEM AND METHOD FOR PROVIDING MUTUAL BREAKPOINT CAPABILITIES IN COMPUTING DEVICE

(75) Inventors: Gil Drori, Petach-Tiqvah (IL); Erez Bar-Niv, Pardesiyaa (IL); David Dahan, Pardes Hanna (IL); Omri Eisenbach, Tel Aviv (IL)

(73) Assignee: Ceva D.S.P. Ltd, Herzelia (IL)

( * ) Notice: Subject to any disclaimer, the term of this patent is extended or adjusted under 35 U.S.C. 154(b) by 642 days.

(21) Appl. No.: 10/986,430

(22) Filed: Nov. 12, 2004

(65) Prior Publication Data
US 2006/0075298 A1 Apr. 6, 2006

Related U.S. Application Data

(60) Provisional application No. 60/612,859, filed on Sep. 27, 2004.

(51) Int. Cl.
*G06F 11/00* (2006.01)
(52) U.S. Cl. .............................. 714/38; 714/30; 714/34; 717/129
(58) Field of Classification Search .................. 714/30, 714/34, 38; 717/129
See application file for complete search history.

(56) References Cited

U.S. PATENT DOCUMENTS

| | | | |
|---|---|---|---|
| 5,970,241 A * | 10/1999 | Deao et al. ................. | 712/227 |
| 5,978,860 A | 11/1999 | Chan et al. | |
| 6,065,106 A * | 5/2000 | Deao et al. .................... | 712/24 |
| 6,175,913 B1 | 1/2001 | Chesters et al. | |
| 6,751,751 B1 | 6/2004 | Murray et al. | |
| 6,798,713 B1 * | 9/2004 | Yearsley et al. .......... | 365/238.5 |
| 7,103,008 B2 * | 9/2006 | Greenblat et al. ........... | 370/258 |
| 7,131,114 B2 * | 10/2006 | Nguyen et al. .............. | 717/129 |
| 2003/0014736 A1 * | 1/2003 | Nguyen et al. .............. | 717/129 |
| 2004/0019831 A1 | 1/2004 | Gergen et al. | |
| 2006/0085684 A1 * | 4/2006 | Drori et al. ................... | 714/34 |

FOREIGN PATENT DOCUMENTS

EP 0 927 938 A1 7/1999
JP 1142848 A 6/1989

* cited by examiner

*Primary Examiner*—Robert Beausoliel
*Assistant Examiner*—Jeison C Arcos
(74) *Attorney, Agent, or Firm*—Browdy and Neimark, P.L.L.C.

(57) ABSTRACT

A system having at least one breakpoint generating module and a core processor and method for providing mutual breakpoint capabilities to at least one breakpoint generating module and a core processor in a computing device. Each breakpoint generating module is capable of generating a first breakpoint message for allowing operation of the core processor and each breakpoint generating module to be halted. A second breakpoint message allows operation of the core processor to be halted. The second breakpoint message corresponds to the first breakpoint message. In addition, the core processor generates a third breakpoint message for allowing operation of the core processor and each breakpoint generating module to be halted.

34 Claims, 7 Drawing Sheets

SYSTEM AND METHOD FOR PROVIDING MUTUAL BREAKPOINT CAPABILITIES IN COMPUTING DEVICE

FIELD OF THE INVENTION

This invention relates to providing breakpoint capabilities in a computing device. More specifically, the invention relates to providing mutual breakpoint capabilities to at least one breakpoint generating module and a core processor in a computing device.

BACKGROUND OF THE INVENTION

FIG. 1 is a block diagram illustrating a computer system 101, implementing a Direct Memory Access controller (referred to hereinafter as "DMA") according to one embodiment of the invention. A core processor 102 and a DMA controller 103 both access data stored in the system's main memory 104. A Memory Interface Unit ("MIU") 105 is used as an interface to the memory, enabling the DMA controller and the core processor to access data stored therein. The main memory 104 can be divided into several address spaces such as a data memory space 106 and a program memory space 107. Among its other roles, the MIU 105 prevents conflicts resulting when the core processor 102 and the DMA controller 103 try to access the same memory address at the same time. Data is channeled between the DMA controller 103 and the MIU 105 via a data bus 108 and between the MIU 105 and the core processor 102 via a data bus 109. Likewise, data is channeled between the MIU 105 and the data memory space 106 via a data bus 110 and between the MIU 105 and the program memory space 107 via a data bus 111.

During processing it is often required to rearrange data and/or to move data segments from one location in memory to another location, i.e. "data transfer". Data transfer can be performed by the core processor 102, however, it is considered as a bottleneck to the core processor's operation. In the absence of a DMA controller 103, the core processor 102 dedicates timeslots for memory management, which would otherwise be dedicated to core processing computations. Therefore, it is the responsibility of the DMA controller 103 to manage and transfer data stored in memory, memory management that is performed in parallel to the core processor's operation. The DMA controller 103 transfers data from a source location to a destination location, or in other words, from source addresses to destination addresses.

The core processor 102 then accesses the data in the destination location, performing operations thereon. Sometimes it may happen that the core processor 102 and the DMA controller 103 both try to access the same memory address at the same time, a situation that gives rise to a conflict whose result is indefinite. In order to prevent such conflicts from occurring, memory access (done by the DMA controller or by the core processor) is performed by the Memory Interface Unit (MIU) 105.

Operation of microprocessors (such as the core processor 102) and other hardware components (such as the DMA controller 103) can be disabled/enabled in several known ways. For example, U.S. Pat. No. 5,978,860 ("System and method for disabling and re-enabling at least one peripheral device in a computer system by masking a device-configuration-space-access-signal with a disable or re-enable signal", Dell USA. L.P., published 1999) discloses a system and a method for disabling and re-enabling peripheral devices (PDs) in a computer system. The system includes a CPU, a host bus coupled to the CPU, a host-bus-to-peripheral-device-bus (HB/PDB) bridge coupled to the host bus, at least one PD, at least one peripheral, device bus coupling the HB/PDB bridge and at least one PD. The system also includes a device, typically in the form of a digital gate, for selectively disabling and re-enabling at least one PD. The method of U.S. Pat. No. 5,978,860 operates in connection with a computer system having a CPU, a HB/PDB bridge coupled to the CPU and capable of sending a device-configuration-space-access-signal (DCSAS) to the DCSAS input pin of a target PD when attempting an access operation, such as a read or a write operation, on the target PD, and one or more system I/O registers having a CONFIG ENABLE bit that reflects a user's request to disable or re-enable a PD. The method intercepts the DCSAS before it reaches the DCSAS input pin of the target PD, provides the intercepted DCSAS to the input of a digital gate such as an AND gate, provides a signal corresponding to the CONFIG ENABLE bit to the input of the same digital gate, and delivers the resulting output signal from the digital gate to the DCSAS input pin of the target PD.

In addition, during development of software and hardware systems, it is sometimes required to debug the operation of the core processor 102 and the DMA controller 103.

Currently in the art there are several methods that allow debugging operation of a DMA controller. For example, EP 927,938 ("Data transfer method and device", published 1999, assigned to Sony Computer Entertainment Inc) discloses debugging of a system which performs DMA transfer between different buses through a buffer. In EP 927,938, a first bus and a second bus are connected through a bus repeater, which has a buffer memory and two DMA (direct memory access) controllers that are connected to the first and second buses, respectively. The bus repeater can send DMA requests to the DMA controllers, and two CPUs can mask those DMA requests. A first of the two DMA controllers transfers data on the first bus to and from a buffer memory in the bus repeater, and the second DMA controller performs DMA transfer between the buffer memory and the second bus. A first of the two CPUs masks the DMA requests of the bus repeater and accesses the buffer directly to check the DMA function.

JP 1142848 ("Address trapping circuit", published 1989, assigned to NEC Corp) discloses a method for checking the normality of data during data transfer by latching data on a data bus with an address signal outputted from a register circuit coincident with an address signal outputted from a direct memory access (DMA) controller to stop DMA operation.

In addition, it is possible to halt the operation of a core processor 102, for example in order to debug its operation, a procedure referred to as a breakpoint. However, when the core processor is halted, the DMA controller 103 can continue transferring data. In such case, the state of the registers and buses, such as the buses 108, 110 and 111 (together composing "data state") can change while debugging, and the developer can get wrong impression of the data state that characterizing the system at any step. Thus, it would be clearly be desirable to solve this drawback by providing a way to halt the DMA when halting the CPU.

In addition, when halting the DMA, in any method known in the art, it is sometimes preferred that the core processor halts as well, preventing it from modifying, for example, the state of the memory or the buses (such as buses 109, 110 and 111). That is, mutual breakpoint capabilities are beneficial for debugging a is computing system including a DMA controller.

SUMMARY OF THE INVENTION

The present invention provides a system for providing mutual breakpoint capabilities to at least one breakpoint generating module and a core processor in a computing device, the system comprising:
- at least one breakpoint generating module capable of generating a first breakpoint message for allowing operation of the core processor and the at least one breakpoint generating module to be halted; and
- a core processor coupled to said at least one breakpoint generating module and being responsive to a second breakpoint message for allowing operation of said core processor to be halted;
- wherein the second breakpoint message corresponds to the first breakpoint message; and
- wherein the core processor generates a third breakpoint message for allowing operation of the core processor and the at least one breakpoint generating module to be halted.

The present invention further provides a system for providing mutual breakpoint capabilities to at least one breakpoint generating module and a core processor in a computing device, the system comprising:
- at least one breakpoint generating module capable of generating a first breakpoint message for allowing operation of the core processor and the at least one breakpoint generating module to be halted;
- at least one halt controller coupled to one or more of the at least one breakpoint generating module and being responsive to said first breakpoint message, for allowing operation of said one or more breakpoint generating modules to be halted; and
- a core processor coupled to said at least one breakpoint generating module and being responsive to a second breakpoint message for allowing operation of said core processor to be halted;
- wherein the second breakpoint message corresponds to the first breakpoint message; and
- wherein the core processor generates a third breakpoint message for allowing operation of the core processor and the at least one breakpoint generating module to be halted.

Still further the invention provides a system for allowing a DMA (Direct Memory Access) controller to halt operation of at least one of a core processor and one or more breakpoint generating modules in a system providing mutual breakpoint capabilities, the system comprising:
- at least one matching comparator responsive to at least one DMA bus and corresponding to a matching condition for indicating when the matching condition is met; and
- a DMA breakpoint generator coupled to the at least one matching comparator and being responsive thereto for generating a DMA breakpoint message capable of halting the operation of said core processor when the matching condition is met.

The present invention further provides a system for allowing a timer to halt operation of at least one of a core processor and one or more breakpoint generating modules in a system providing mutual breakpoint capabilities the system comprising:
- a matching comparator responsive to a timer clock signal and corresponding to a matching condition, for indicating when the matching condition is met; and
- a timer breakpoint generator coupled to the matching comparator and being responsive thereto for generating a timer breakpoint message capable of halting the operation of the at least one of said core processor and one or more breakpoint generating modules.

The present invention further provides a method for providing mutual breakpoint capabilities to at least one breakpoint generating module and a core processor in a computing device, the method comprising:
- generating a first breakpoint message in one of the at least one breakpoint generating module; and
- conveying the first breakpoint message so as to allow halting the operation of one or more of the at least one breakpoint generating modules and the core processor.

Still further the invention provides a method for providing mutual breakpoint capabilities to at least one breakpoint generating module and a core processor in a computing device, the method comprising:
- generating a third breakpoint message in one of the core processor; and
- conveying the third breakpoint message so as to allow halting the operation of one or more of the at least one breakpoint generating modules and the core processor.

In addition, the invention provides a method for halting operation of at least one breakpoint generating module and a core processor in a system providing mutual breakpoint capabilities in a computing device, the method comprising:
- receiving a breakpoint message;
- retrieving an indication stored in an enabler field of a halt controlling register, the halt controlling register corresponds to the breakpoint message;
- if the indication indicated that operation of a module respective of the enabler field is to be halted
- generating a corresponding halt signal; and
- conveying the corresponding halt signal so as to allow halting the operation of the module.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
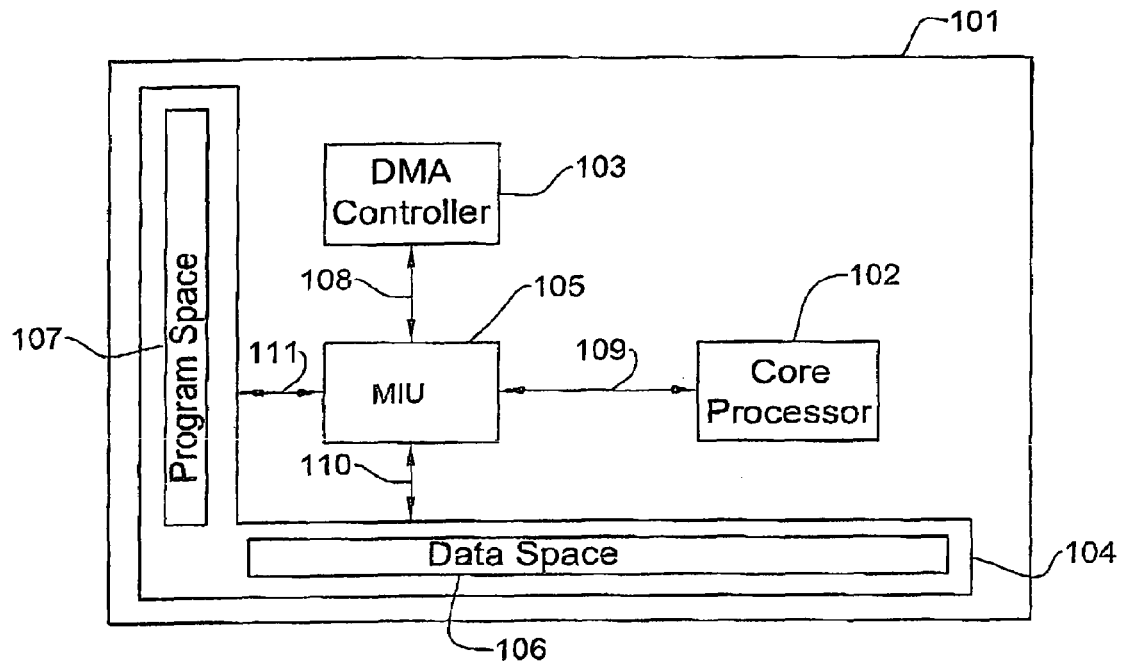
FIG. 1 is a block diagram illustrating a computer system implementing a direct memory access controller according to one embodiment of the invention.

In the following description components that are common to more than one figure will be referenced by the same reference numerals.

Figure 2:
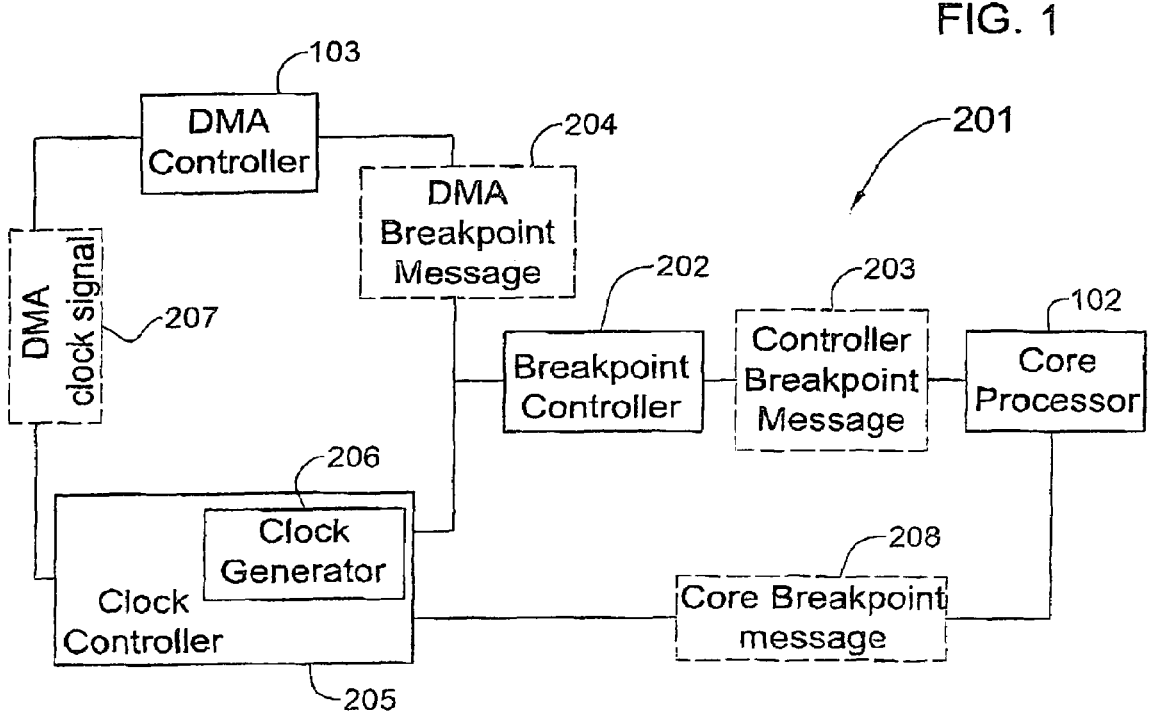
FIG. 2 is a block diagram illustrating a system providing mutual breakpoint capabilities for halting the operation of a core processor and a DMA controller, according to one embodiment of the invention.

FIG. 2 is a block diagram illustrating a system 201 providing mutual breakpoint capabilities for halting the operation of a core processor and a DMA controller, according to one embodiment of the invention. A core processor 102 is coupled to a breakpoint controller 202 that provides controller breakpoint messages 203 (constituting a "second breakpoint message") thereto. One example for a controller breakpoint message can be a signal, such as a breakpoint signal known per se. The core processor 102 is responsive to the controller breakpoint message 203 for halting its operation. To this end, the core processor 102 can include an emulation module (not shown) as known to those versed in the art, which traps a controller breakpoint message 203 and changes the mode of operation of the core processor 102 to debug mode as known per se.

The breakpoint controller 202 responds to DMA breakpoint messages 204 received from a DMA controller 103 coupled thereto. When the breakpoint controller 202 receives a DMA breakpoint message 204, it generates a controller breakpoint message 203. It will be appreciated that the DMA breakpoint messages 204 can be, for example, a signal.

The DMA controller 103 provides DMA breakpoint messages 204 also to a clock controller 205. The clock controller 205 includes a clock generator 206 that provides clock ticks. The clock controller 205 provides clock signals corresponding to the clock ticks, to different entities in the system 201. Clock signals provided to the DMA controller 103 are referred to hereinafter as DMA clock signals 207. When the clock controller 205 receives a DMA breakpoint message 204, it prevents DMA clock signals 207 from reaching the DMA controller 103, thereby halting its operation. In other words, a person versed in the art can understand that by generating a DMA breakpoint message 204 the DMA controller 103 can halt the operation of the core processor and/or its own operation.

In addition, the clock controller 205 is coupled to the core processor 102. When the operation of the core processor is halted by a controller breakpoint message 203 it generates a core breakpoint message 208 (constituting a "third breakpoint message") such as a breakpoint acknowledge known per se or any other signal that is then received by the clock controller 205. The clock controller 205 is responsive to the core breakpoint message 208 for preventing clock signals (including DMA clock signals 207) from reaching the DMA controller 103, in a mechanism described in detail below (see for example FIG. 4) halting its operation thereby. That is, a person versed in the art will understand that by generating a core breakpoint message 208 the core processor 102 can halt the operation of the DMA controller 103. It should be appreciated that methods are known today by which the core processor 102 can halt its own operation. In addition the core can halt its own operation in a way similar to this by which the DMA controller can halt the operation of the controller (e.g., via the clock controller 205) as will be explained with further details below.

It should also be noted that the core processor can halt the operation of the DMA controller 103 at any time, and not only as a consequence of entering a debug mode. Thus, breakpoint acknowledge is not the only type of core breakpoint message 208 allowed.

FIG. 2 illustrates a system allowing generation of mutual breakpoints for halting the operation of a core processor and a DMA controller. That is, the core processor can halt the operation of the DMA controller as well as its own operation while the DMA controller can halt the operation of the core processor as well as its own operation. The DMA controller constitutes a breakpoint generating module. However, sometimes there are other breakpoint generating modules being part of a mutual breakpoint generating system, such as a timer.

Figure 3:
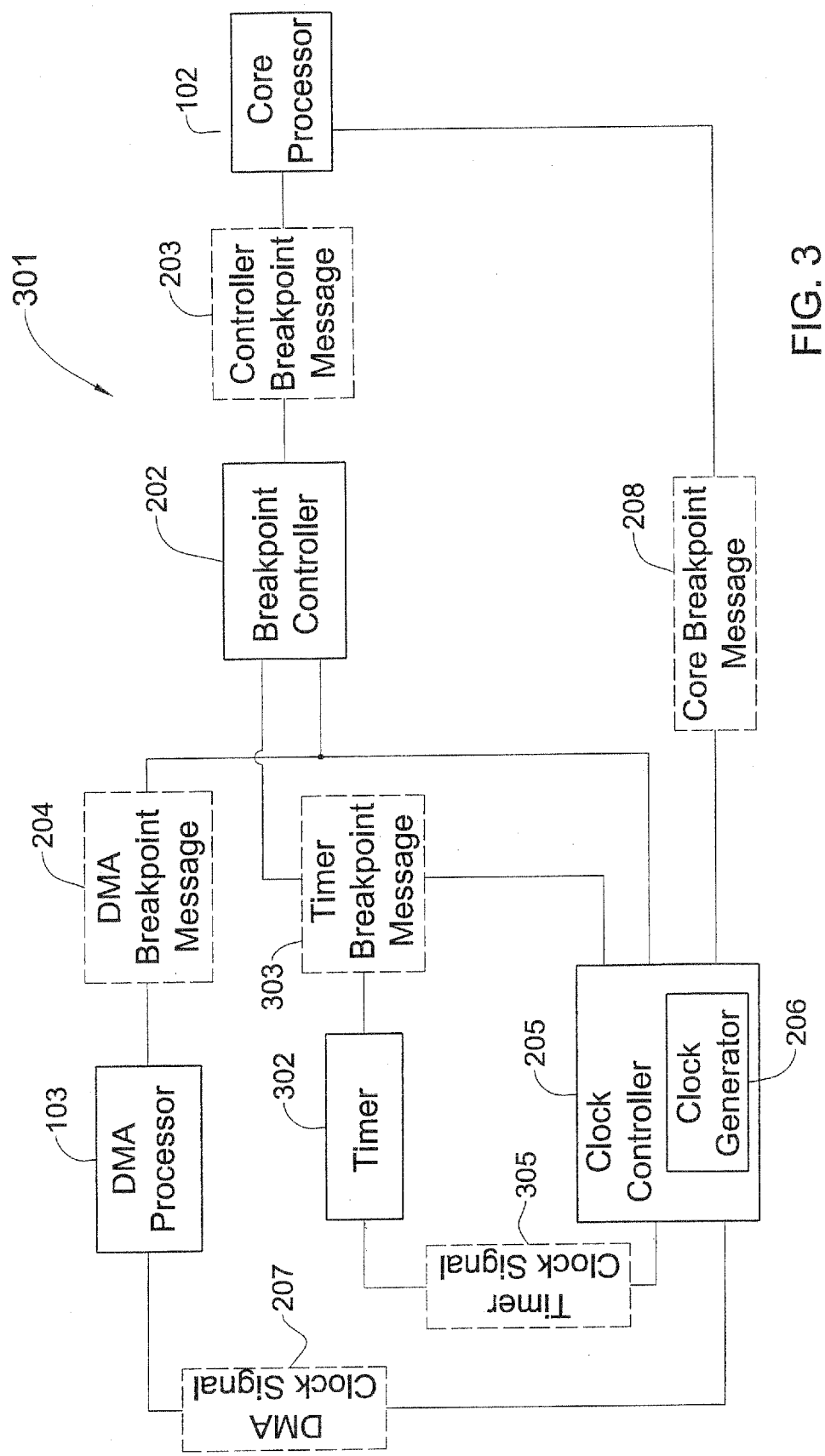
FIG. 3 is a block diagram illustrating a system providing mutual breakpoint capabilities for halting the operation of a core processor a DMA controller and a timer, according to one embodiment of the invention.

FIG. 3 is a block diagram illustrating such a system 301 providing mutual breakpoint capabilities for halting the operation of a core processor 102, a DMA controller 103 and a timer 302, according to one embodiment of the invention. The timer 302 generates a timer breakpoint message 303 when a measured time span expires. The breakpoint controller 202 is coupled to the timer 302 and is responsive to the timer breakpoint message 303 for generating a controller breakpoint message 203 that halts the operation of the core processor 102 as was previously explained with reference to FIG. 2.

It is noted that the DMA breakpoint message and/or the timer breakpoint message constitute a first breakpoint message. More generally, a breakpoint message generated by a breakpoint generating module is referred to as a first breakpoint message.

It should be noted that the timer breakpoint message 303 can be for example, a signal. In addition, after realizing that other breakpoint messages (such as the controller breakpoint message 203, the DMA breakpoint message 204 or the core breakpoint message 208) can also be signals, it can be generally said that breakpoint messages can be realized, for example, in the from of signals known per se.

The timer 302 is coupled also to a clock controller 304 and is responsive to timer clock signals 305 that are generated thereby in addition to the DMA clock signals 207.

Upon receiving a timer breakpoint message 303, the clock controller 304 prevents clock signals (including DMA clock signals 207 and/or timer clock signals 305) from reaching the DMA controller 103, and/or the timer 302 in a mechanism described in detail below (see, for example FIG. 4), halting their operation thereby.

It is noted that in system 301 the DMA controller 103 can halt the operation of the core processor 102, the operation of the timer 302 (via the clock controller 304) and/or its own operation. Similarly, the core processor 102 can halt the operation of the DMA controller 103, the operation of the timer 302 and/or its own operation. Finally, the timer 302 can also halt the operation of the DMA controller 103, the operation of the core processor 102 as well as its own operation. That is, system 301 illustrates mutual breakpoint capabilities between the core processor 102, the DMA controller 103 and the timer 302.

Figure 4:
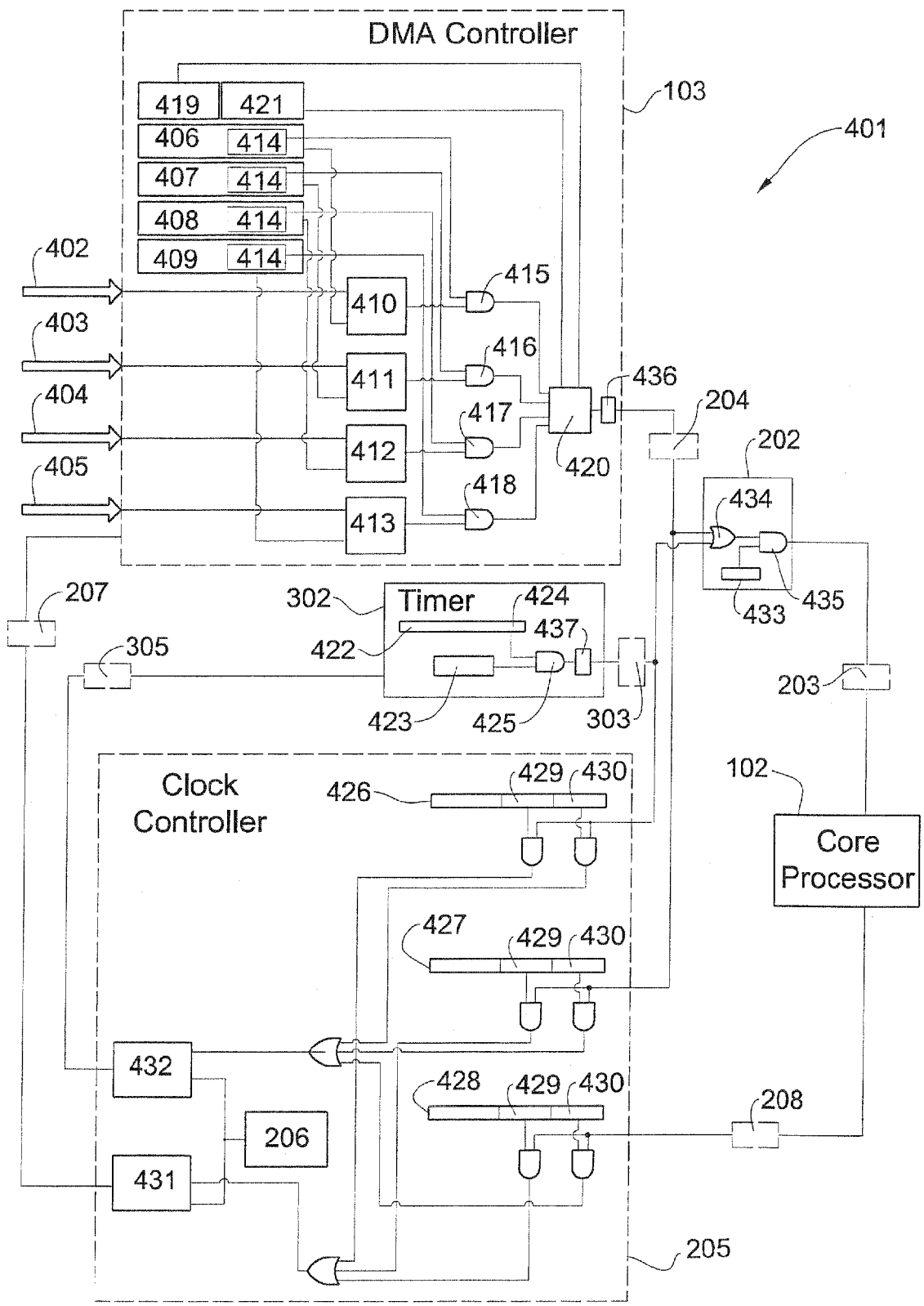
FIG. 4 illustrates a circuit providing mutual breakpoint capabilities to the system of FIG. 3, according to one embodiment of the invention.

Having demonstrated that mutual breakpoint capabilities can exist between different breakpoint generating modules (such as the DMA controller 103 and the timer 302) and a core processor 102 in a computing system (such as system 201 or 301), there will now be described with reference to FIG. 4 a circuit 401 providing mutual breakpoint capabilities to the system 301 of FIG. 3, according to one embodiment of the invention. It should be noted that the circuit 401 corresponds to the system 301 of FIG. 3. Yet, a person versed in the art will realize that the embodiment illustrated in FIG. 4 is non-limiting, and other circuits allowing mutual breakpoint capabilities, including other breakpoint generating modules, can also be employed, such as a circuit corresponding to system 201 (of FIG. 2).

It will be realized that the operation of a DMA controller (such as DMA controller 103) is allowed by receiving clock signals such as clock ticks or DMA clock signals 207 indicative thereof. In addition, it is known to those versed in the art that a DMA controller can access data (hereinafter "source data") located at a certain source address, read the accessed data and write it (constituting "destination data") to a destination address. This is illustrated as if the DMA controller 103 has four buses, namely "source address bus" 402, "destination address bus" 403, "source data bus" 404 and "destination data bus" 405. Generally the four buses are referred to as "DMA buses".

In addition, the embodiment currently described illustrates generation of DMA breakpoint messages 204 corresponding to certain conditions occurring at the DMA controller 103 as will be described below. It should be noted that the embodiment is non-limiting and different conditions than those described below can also lead to the generation of a DMA breakpoint message 204.

According to the embodiment, conditions for generating a DMA breakpoint message include, for example, when the DMA controller detects a specific value (constituting "source value" or "source data") in any source address; or when it detects a specific value (constituting "destination value" or "destination data") in any destination address; or when it transfers any value from, a specific source address, etc.

It will be appreciated that in, order to detect when a condition occurs corresponding to which a DMA breakpoint message should be generated, the DMA controller 103 compares a certain value (hereinafter, "reference value") with another value (constituting "temporal value") that is currently accessed by the DMA controller for example via the four buses. In one of the examples above wherein the DMA is expected to generate a DMA breakpoint message when it accesses a specific source address, the temporal value is the source address currently accessed by the DMA, while the reference value is the specific source address. Sometimes more than one reference value exists. Reference values can be stored in registers generally referred to as "reference registers".

In the embodiment illustrated in FIG. 4 there are four reference registers, namely a "source address reference register" 406, a "destination address reference register" 407, a "source data reference register" 408 and a "destination data reference register" 409. It should be realized that source address reference register 406 corresponds to source address bus 402, destination address reference register" 407 corresponds to destination address bus 403; source data reference register 408 corresponds to source data bus 404; and destination data reference register 409 corresponds to destination data bus 405. The correspondence between the reference registers and their respective buses is explained below with reference to matching comparators.

A "matching condition" is a logical term allowing comparison, of the reference values stored in the reference registers with the respective temporal value indicated by the buses. It should be noted that a matching condition can use any logical operator applicable, such as equality ('='), greater than ('>'), smaller than ('<'), greater than or equal to ('≧') and others. The logical term can be hard-coded or programmable. Further below a convention is taken wherein a matching condition that is fulfilled is considered as evaluated as 'true' (for example, if A=5 and B=3 then the condition A>B evaluates as 'true'), whereas a condition that is not fulfilled is considered as 'false' (in the previous example the condition B>A is evaluated as 'false'). However, this is non-limiting and the opposite convention can be taken as well.

A "matching comparators" associated with a matching condition, has at least one temporal value and at least one reference value accessible thereto. The embodiment of FIG. 4 illustrates four matching comparators, namely, a "source address matching comparator" 410, a "destination address matching comparator" 411, a "source data matching comparator" 412 and a "destination data matching comparator" 413. For the sake of simplicity, the correspondence of the matching comparators to the DMA buses and to the reference registers is illustrated in Table 1, wherein the in matching comparator of each line corresponds to the DMA bus and the reference register of the same line.

TABLE 1

| Matching comparator | DMA bus | Reference register |
|---|---|---|
| source address matching comparator (410) | source address bus (402) | source address reference register (406) |
| destination address matching comparator (411) | destination address bus (403) | destination address reference register (407) |
| source data matching comparator (412) | source data bus (404) | source data reference register (408) |
| destination data matching comparator (413) | destination data bus (405) | destination data reference register (409) |

In other words, the matching condition associated with the source address matching comparator 410 compares the source address currently accessed by the DMA controller (i.e., the temporal value is represented by the value currently conveyed by the source address bus 402) with the address indicated by the corresponding source address reference register 406. Similarly, the matching condition associated with the destination address matching comparator 411 compares the temporal value represented by the destination address bus 403 (i.e. the destination address currently accessed by the DMA controller) with the address indicated by the corresponding destination address reference register 407 etc.

It should be noted that the described embodiment includes four DMA buses, four reference registers and four matching comparators. Yet, the number four is non-limiting and other embodiments can include a different number of buses, registers or comparators. In addition, the number of the buses is not necessarily similar to the number of matching comparators and a different number of reference registers can also be employed. For example, several different matching comparators can correspond to a single common DMA bus. Alternatively, a matching condition associated with a matching comparator can compare a value indicated by a single reference register (for example, 'A') to two different temporal values indicated by two different DIM buses (e.g., TemporalValueX and TemporalValueY) in a single logical expression (such as "TemporalValueX>A>TemporalValueY").

According to one embodiment, the DMA controller 103 generates a DMA breakpoint message 204 whenever any one of the matching conditions evaluates as 'true'. Alternatively, according to another embodiment of the invention, a reference register can include a breakpoint enabler field 414. The size of the breakpoint enabler field 414 can be any side. It is noted that the breakpoint enabler field 414 need not be included in the reference register but can be associated therewith by any method known in the art.

A breakpoint on/off switch, or shortly a "breakpoint switch", is coupled to a matching comparator and to a corresponding breakpoint enabler field 414. A DMA breakpoint message is generated only when the respective breakpoint enabler field 414 indicates that the corresponding DMA breakpoint message generation is enabled (according to this embodiment, when the respective breakpoint enabler field 414 is set to 1) and the respective matching condition (the one associated with the matching comparator) evaluates to 'true'. This is non-limiting of course, and any other convention is allowed as well, e.g., a DMA breakpoint message can be generated only when the respective breakpoint enabler field 414 is set to 0 and the respective matching condition (the one associated with the matching comparator) evaluates to 'true' etc.

In FIG. 4 there are four breakpoint switches illustrated (namely "source address breakpoint switch" 415, "destination address breakpoint switch" 416, "source data breakpoint switch" 417 and "destination data breakpoint switch" 418), each corresponding to a respective one of the matching comparators 410, 411, 412 and 413.

Alternatively (not illustrated in the figure), the matching comparator can be associated with the respective breakpoint enabler field 414, evaluating the matching condition only if the breakpoint enabler field 414 indicates that the corresponding DMA breakpoint message generation is enabled.

Thus, the breakpoint enabler field 414 allows controlling (that is, enabling and disabling) the operation of the corresponding matching comparator. More generally, an enabler field allows disabling or enabling the operation of a constituent of the system.

In the embodiments described so far a DMA breakpoint message is generated whenever any matching condition is evaluated as 'true' and its respective breakpoint enabler field 414 is set to 1. The comparators illustrated are associated with "simple" matching conditions, i.e., each condition corresponds to two parameters such as one DMA bus and one reference register. Yet, it can be appreciated that "composite" matching conditions are allowed, wherein one comparator is associated with more than two parameters. For example, two DMA buses and, two reference registers. An example of a composite matching condition is "if a specific source address AND a specific destination address are accessed." It will be appreciated that it is also possible to associate more than one enabler field with such a composite matching comparator. A DMA breakpoint message generated in accordance with a composite matching condition constitutes a composite DMA breakpoint message.

In a different embodiment the matching comparator can be associated with more than one DMA bus but with no reference register. Such a matching comparator can be associated with a matching condition such as "if source data≠destination data", wherein a DMA breakpoint can be generated whenever the data changes between reading it from the source address and writing to the destination address.

In the embodiment of FIG. 4, the matching comparators are associated with simple matching conditions comparing one temporal value with one reference value. Yet composite conditions for generating DMA breakpoint messages are allowed by providing a breakpoint selection register 419, encoding the combination of matching conditions that should evaluate as 'true' in order to generate a DMA breakpoint message 204. For example, if the breakpoint selection register 419 is considered as a bit field then ever bit therein corresponds with a matching condition (i.e., with a matching comparator associated therewith). A bit set to 1 in the breakpoint selection register 419 indicates that the corresponding matching condition should evaluate to 'true' in order to generate a DMA breakpoint message. As was mentioned before, here also the opposite policy is allowed.

The breakpoint selection register 419 and the breakpoint switches (415, 416, 417 and 418) are coupled to a selection comparator 420. In an embodiment where there are no breakpoint switches, the selection comparator 420 is coupled directly with the matching comparators.

The selection comparator 420 generates (or allows the DMA controller 103 to generate) a DMA breakpoint message 204 only when all those breakpoint switches whose corresponding bits in the breakpoint selection register 419 are set to 1 are evaluated as 'true' mid enabled.

It is appreciated that the size of the breakpoint selection register 419 can be any number of bits applicable to the case. However, according to the current example the breakpoint selection field size is four bits, corresponding to the number of matching comparators. Yet, this embodiment is non-limited and it should be appreciated that any other correspondence is also applicable. For example, there may be an embodiment where two bits are used to indicate whether a certain matching condition should be evaluated as 'true'.

In the following Table 2 are listed possible values indicated by the breakpoint selection register 419 and the corresponding matching conditions that should evaluate to 'true' in order for the selection comparator 420 to generate a DMA breakpoint message.

TABLE 2

| Matching conditions | Breakpoint selection register |
|---|---|
| source data matching comparator | 0001 |
| destination data matching comparator | 0010 |
| source address matching comparator | 0100 |
| destination address matching comparator | 1000 |
| source data AND destination data matching comparators | 0011 |
| source data AND source address matching comparators | 0101 |
| source data AND destination address matching comparators | 1001 |
| destination data AND source address matching comparators | 0110 |
| destination data AND destination address matching comparators | 1010 |
| source address AND destination address matching comparators | 1100 |
| source data AND destination data AND source address matching comparators | 0111 |
| source data AND destination data AND destination address matching comparators | 1011 |
| source data AND source address AND destination address matching comparators | 1101 |
| destination data AND source address AND destination address matching comparators | 1110 |
| Source data AND destination data AND source address AND destination address matching comparators | 1111 |

TABLE 2-continued

| Matching conditions | Breakpoint selection register |
|---|---|
| destination address matching comparators | |

In the example of Table 2 a combination of one or more matching conditions were illustrated wherein AND conditions were used. It should be noted that in a different embodiment, OR conditions can be used as well, such as "destination address OR source address" etc. This is non-limiting and any condition that applies can be used instead.

Thus, the selection comparator 420 evaluates the matching conditions in accordance with the breakpoint selection register 419. In the embodiment described above a DMA breakpoint message is generated whenever all the matching conditions corresponding to one-bits (i.e., bits whose value is 'one') in the breakpoint selection register 419 are evaluated as 'true'. Other matching conditions can evaluate as 'true' or as 'false', not affecting the generation of the DMA breakpoint message. Yet a different embodiment allows determining if a matching condition corresponding to a zero bit in the breakpoint selection register 419 must be 'false' or can be evaluated to any value whatsoever. According to this embodiment, there is an exclusiveness field 421 coupled to the selection comparator 420. The exclusiveness field 421 includes, for example, bits, wherein each bit corresponds to one bit in the breakpoint selection register 419, i.e. the exclusiveness field 421 contains an equal number of bits as the breakpoint selection register 419.

The bits in the exclusiveness field 421 indicate whether zero-bits (i.e., bits whose value is 'zero') in the breakpoint selection register 419 are to be considered exclusively. That is, if a bit in the breakpoint selection register 419 is zero while the corresponding matching condition is 'true', whether or not the selection matching comparator 415 should generate a DMA breakpoint message 204.

In other embodiments, such as the embodiment of FIG. 4, the DMA breakpoint messages 204 are generated by a DMA breakpoint generator 436 and not by the selection matching comparator 415. The DMA breakpoint generator 436 is responsively coupled to the selection comparator 420. When the selection comparator indicates that the DMA should generate a DMA breakpoint, the DMA breakpoint generator 436 generates it. However, this is non-limiting and it will be appreciated that when a DMA breakpoint generator 436 does not exist, the module where the DMA breakpoint is generated (such as the selection comparator 420 mentioned in the example above) is considered as a DMA breakpoint generator.

Turning now to the timer 302 (see FIG. 3), it is considered that the timer actually allots time, or more specifically, generates a timer breakpoint message 303 when a measured time span expires. In order to allot time, the timer includes a timer counter 422 and a timer condition 423. As will be appreciated by a person versed in the art, the timer counter can store a value used for counting.

Referring again to FIG. 3, it was described before that the timer is responsive to the timer clock signal 305 generated by the clock controller 304. When initializing the timer 302 the timer counter 422 is set to indicate the number of clock signals expected before the time span expires.

When the timer receives a timer clock signal 305 the value stored in the timer counter 422 is decreased by one. In addition, the timer comparator 423 compares the current value stored in the timer counter 422 with zero. When the timer comparator 423 finds that the value stored in the timer counter 422 is zero, a timer breakpoint message 303 is generated. The timer breakpoint is generated by a timer breakpoint generator 437 responsive to the timer comparator 423.

It will be appreciated that in an alternative embodiment a different allotting policy can be used. For example, when the timer 302 is initialized, the value stored in the timer counter 422 is set to zero while the timer comparator 423 is programmed to indicate the number of clock signals expected before the time span expires (an "allotted value"). In every clock signal the value stored in the timer counter 422 is increased. When the timer comparator 423 detects that the value stored in the timer counter 422 is equal to the allotted value, a timer breakpoint message is generated.

It should further be appreciated that the timer comparator 423 is associated with a logical term (referred to as the "timer condition") allowing comparison of the value stored in the timer counter 422 with the respective value indicated by the timer comparator 423. It should be noted that the timer condition can use any logical operator applicable, such as equality ('='), greater than ('>'), smaller then ('<'), greater than or equal to ('≧') and others. The logical term can be hard-coded or programmable.

Referring back to the description of the DMA controller 103 and to the description of the reference registers (such as 406-408), an analogy can be made. That is, the timer counter 103 can be considered as a reference register, while the timer comparator 423 can be considered as a match comparator.

It should be further appreciated that the timer can also include a timer breakpoint enabler field 424, having a functionality that resembles that of the breakpoint enabler field 414, that is, to toggle an on/off switch 425, allowing or preventing the generation of timer breakpoint messages 303 thereby.

It was already explained, with reference to FIGS. 2 and 3, that the DMA controller 103 and the timer 302 are responsively coupled to the clock controller 304 for receiving respectively DMA clock signals 207 and timer clock signals 305 therefrom. It was also explained that by halting the respective clock signals the clock controllers 205 and 304 halt the operation of the DMA controller 103 and the timer 302. In addition, it was mentioned that the clock controller 304 is responsively coupled to the DMA controller 103, timer 302 and core processor 102 for receiving DMA breakpoint messages 204, timer breakpoint messages 303 and core breakpoint messages 208, respectively.

FIG. 4 illustrates that the clock controller 304 includes three halt controlling registers (hereinafter referred to also as "clock control registers"), namely "timer controlled halt register" 426, "DMA controlled halt register" 427 and "core controlled halt register" 428. Each of the clock control registers includes or is associated with a DMA halt enabler field 429 and a timer halt enabler field 430. Both the DMA halt enabler field 429 and the timer halt enabler field 430 can be one bit or larger in size.

The clock controller 304 also includes a DMA clock signal generator 431 and a timer clock signal generator 432. The DMA clock signal generator 431 and the timer clock signal generator 432 are coupled to the clock generator 206, for generating clock signals such as DMA clock signals 207 and timer clock signals 305 in response to receiving clock ticks therefrom.

When the clock controller 304 receives a DMA breakpoint message 204 the DMA controlled halt register 427 and its associated enabler fields 429 and 430 are checked. If the DMA halt enabler field 429 indicates that halting the DMA is enabled, the operation of the DMA clock signal generator 431 is halted, thereby halting the generation of DMA clock signals 207. The DMA controller 103 receives no clock signals, and its operation is halted. Operation can be resumed, for example, by re-setting the DMA halt enabler field 429 to indicate that halting the DMA is disabled. This can be done, for example, by the core processor (or by a programmer operating the core processor), as known to those versed in the art. Similarly, if the timer halt enabler field 430 indicates that halting the timer is enabled, the operation of the timer clock signal generator 432 is halted, thereby halting the generation of timer clock signals 305. The timer 302 receives no clock signals, and its operation is halted. Operation can be resumed, for example, by resetting the timer halt enabler field 430 to indicate that halting the timer is disabled.

Similar mechanisms allow the clock controller 304 to respond to timer breakpoint messages 303 and core breakpoint messages 208. When the clock controller 304 receives a timer breakpoint message 303, the timer controlled halt register 426 and its associated enabler fields 429 and 430 are checked. If the DMA halt enabler field 429 indicates that halting the DMA is enabled, the operation of the DMA clock signal generator 431 is halted, thereby halting the generation of DMA clock signals 207. The DMA controller 103 receives no clock signals, and its operation is halted. Operation can be resumed, for example, by re-setting the DMA halt enabler field 429 to indicate that halting the DMA is disabled. Similarly, if the timer halt enabler field 430 indicates that halting the timer is enabled, the operation of the timer clock signal generator 432 is halted, thereby halting, the generation of timer clock signals 305. The timer 302 receives no clock signals, and its operation is halted. Operation can be resumed, for example, by re-setting the timer halt enabler field 430 to indicate that halting the timer is disabled.

When the clock controller 304 receives a core breakpoint message 208, the core controlled halt register 428 and its associated enabler fields 429 and 430 are checked. If the DMA halt enabler field 429 indicates that halting the DMA is enabled, the operation of the DMA clock signal generator 431 is halted, thereby halting the generation of DMA clock signals 207. The DMA controller 103 receives no clock signals, and its operation is halted. Operation can be resumed, for example, by re-setting the DMA halt enabler field 429 to indicate that halting the DMA is disabled. Similarly, if the timer halt enabler field 430 indicates that halting the timer is enabled, the operation of the timer clock signal generator 432 is halted, thereby halting the generation of timer clock signals 305. The timer 302 receives no clock signals, and its operation is halted. Operation can be resumed, for example, by re-setting the timer halt enabler field 430 to indicate that halting the timer is disabled.

It should be appreciated that in other embodiments, where other breakpoint generating modules are coupled to the mutual breakpoint generating system, the clock controller 304 includes a corresponding clock control register and a corresponding clock signal generator for each breakpoint generating module. In addition, an enabler field controlled by each breakpoint generating module is associated with each clock control register. The circuit and mechanism described above with reference to the clock control 304 can apply then to any number of breakpoint generating modules.

Turning now to the breakpoint controller 202, it was previously mentioned with reference to FIGS. 2 and 3 that the breakpoint controller 202 is responsively coupled to the DMA controller 103 and to the timer 302, for receiving respective breakpoint messages (i.e., DMA breakpoint messages 204 and timer breakpoint messages 303) therefrom. Generally, the breakpoint controller is responsive to respective breakpoint messages received from breakpoint generating modules coupled thereto.

The breakpoint controller 202 also includes, or is associated with a core halt enabler field 433. When the breakpoint controller 202 detects on 434 that at least one breakpoint message is received, and on 435 that the core enabler field 433 indicates that halting core operation is enabled, a controller breakpoint message 203, such as a breakpoint signal known per se is generated and fed to the core processor 102. When the core receives a controller breakpoint message 203 it enters a debug mode as known to those versed in the art.

The clock controller 304 described so far is one non-limiting example for providing a way to halt the operation of breakpoint generating modules. Other embodiments are possible as will now be described with reference to FIGS. 5 and 6. Therefore the general term "halt controller" is used hereinafter. That is, the clock controller 304 is one embodiment of a halt controller.

Figure 5:
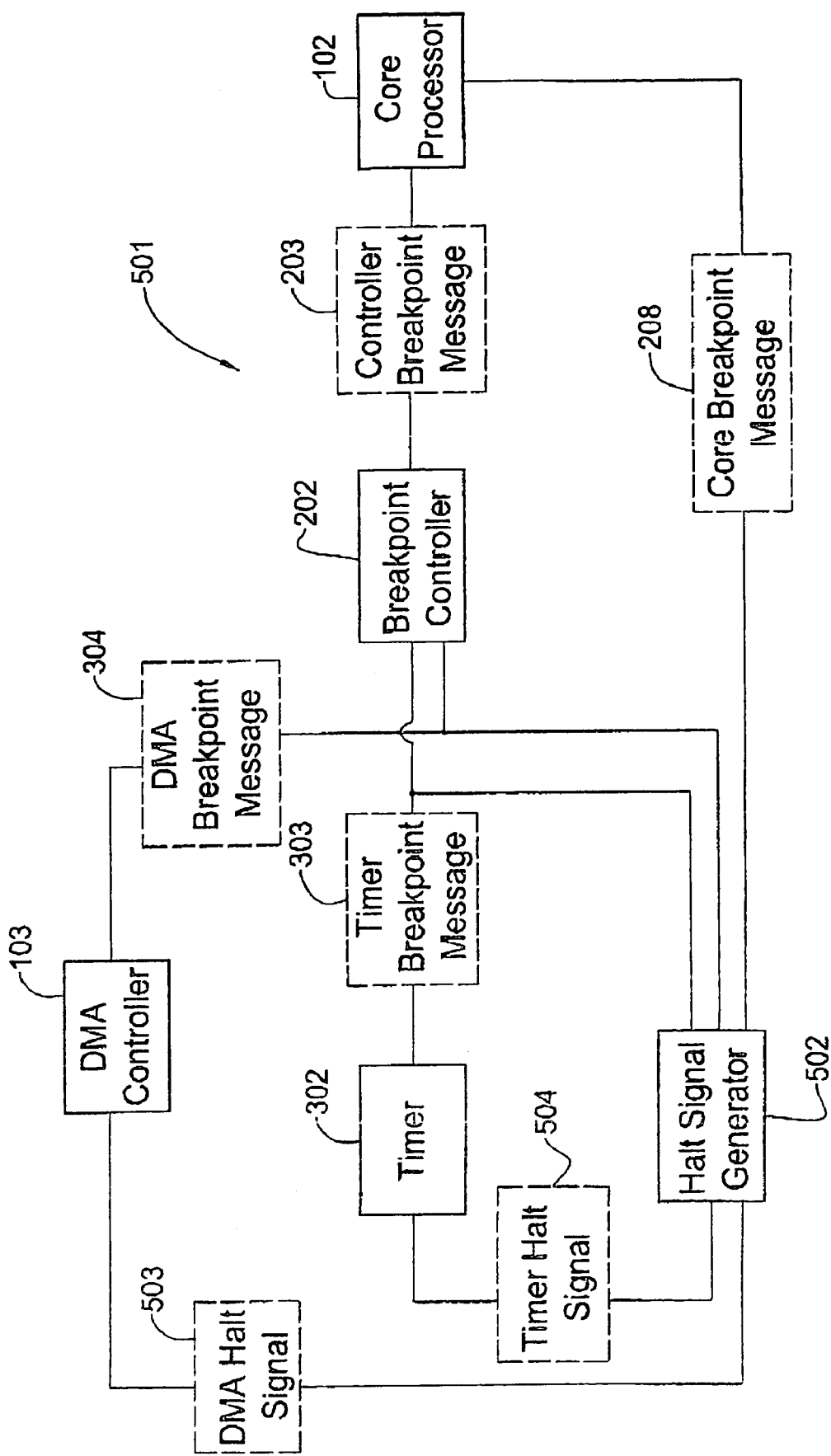
FIG. 5 is a block diagram illustrating an alternative system providing mutual breakpoint capabilities for halting the operation of a core processor, a DMA controller and a timer, according to one embodiment of the invention.

FIG. 5 shows such an alternative system 501 that provides mutual breakpoint capabilities and includes a halt signal generator that serves as a halt controller. A DMA controller 103, conveying DMA breakpoint messages 204 (a DMA breakpoint message can constitute a "first breakpoint message", as was previously noted) is coupled to a breakpoint controller 202. The breakpoint controller 202, is coupled to a core processor 102, conveying controller breakpoint messages 203 thereto. A controller breakpoint message 203 constitutes a "second breakpoint message".

A timer 302, conveying timer breakpoint messages 303, is also coupled to the breakpoint controller 202. A timer breakpoint message 303, can also constitute a "first breakpoint message" as was previously explained.

A halt signal generator 502 is coupled to the DMA controller 103, to the timer 302 and to the core processor 102 receiving their respectively conveyed DMA breakpoint messages 204, timer breakpoint messages 303 and core breakpoint messages 208. The halt signal generator 502 conveys halt signals to (such as a DMA halt signal 503 and/or a timer halt signals 504) to the DMA controller 103 and to the timer 302.

Figure 6:
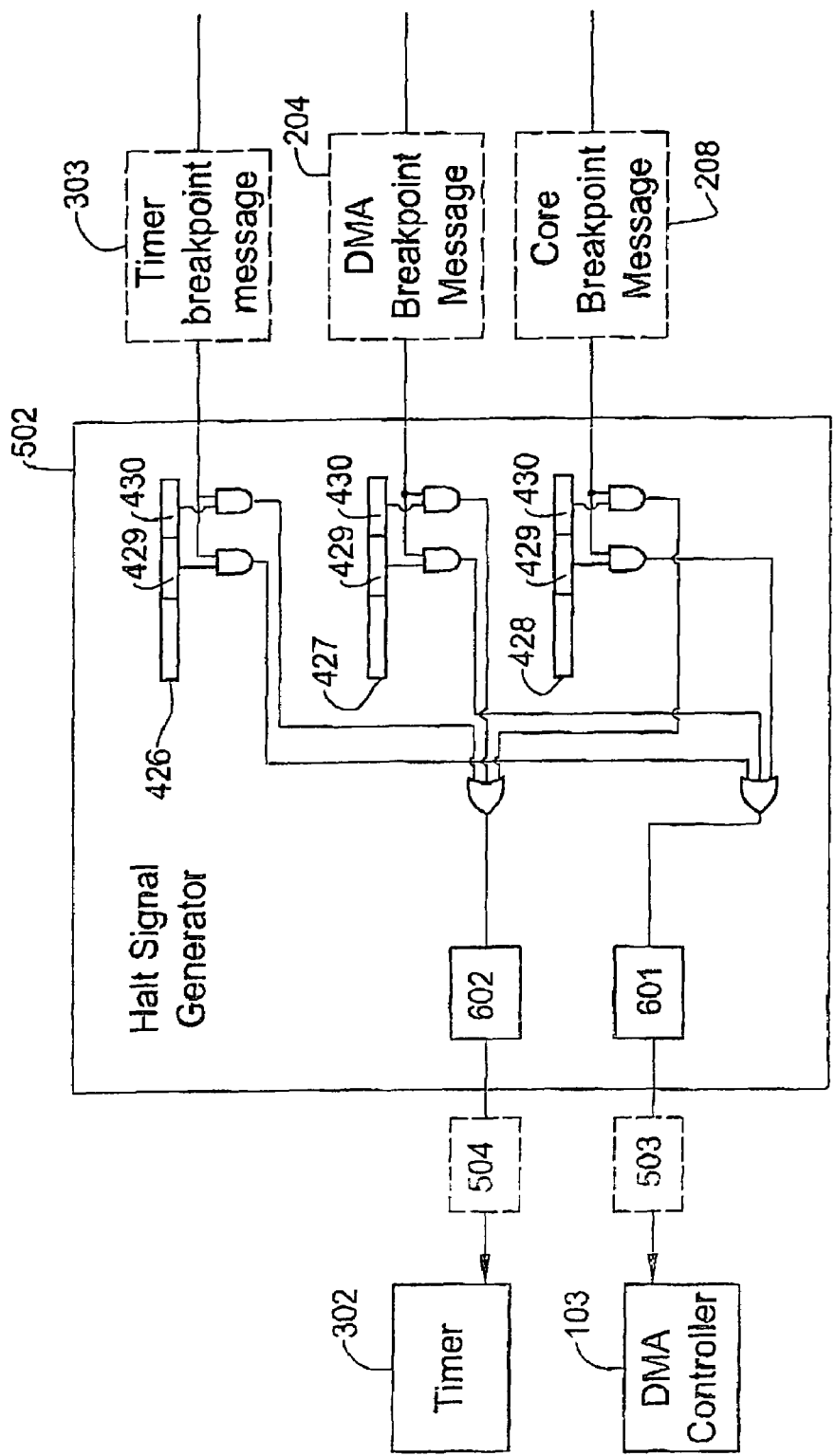
FIG. 6 illustrates a halt signal generator circuit that provides mutual breakpoint capabilities to the system of FIG. 5, according to one embodiment of the invention.

FIG. 6 illustrates a halt signal generator circuit providing mutual breakpoint capabilities to the system of FIG. 5, according to one embodiment of the invention. Like the clock controller 304, the halt signal generator 502 includes three halt controlling registers, namely, a timer controlled halt register 426, a DMA controlled halt register 427 and a core controlled halt register 428. Each of the halt controlling registers includes or has associated therewith a DMA halt enabler field 429 and a timer halt enabler field 430. Both the DMA halt enabler field 429 and the timer halt enabler field 430 can be one bit or larger in size.

According to the embodiment the halt signal generator 502 includes also a DMA halt signal generator 601 and a timer halt signal generator 602 for generating DMA halt signals 503 and timer halt signals 504 respectively. When the halt signal generator 502 receives a timer breakpoint message 303, the timer controlled halt register 426 and its associated enabler fields 429 and 430 are checked. If the DMA halt enabler field 429 indicates that halting the DMA is enabled, the DMA halt signal generator 601 generates a DMA halt signal 503 that is conveyed to the DMA controller 103. Similarly, if the timer halt enabler field 430 indicates that halting the timer is enabled, the timer halt signal generator 602 generates a timer halt signal 504 that is conveyed to the timer 302.

Likewise, the DMA controlled halt register 427 together with a DMA breakpoint message 204 received at the halt signal generator 502 are used to determine if a halt signal should be generated by the DMA halt signal generator 601 or by the timer halt signal generator 602, while the core halt register 428 is used for the same in combination with a core breakpoint message 208 received at the halt signal generator 502.

Halting modules such as the breakpoint generating modules (DMA controller and timer in this example), i.e., disabling their operation, is known in the art, as illustrated, e.g., by above-mentioned U.S. Pat. No. 5,978,860. In addition it should be appreciated that operation can be resumed (i.e., enabled), for example, by re-setting the DMA halt enabler field 429 to indicate that halting the DMA is disabled.

Following the description above it will be appreciated that in the described embodiment one halt controlling register (such as the DMA controlled halt register 427) is used for controlling the operation of more than one breakpoint generating module. In this example, the DMA controlled halt register 427 controls tire operation of both the DMA controller 103 and the timer 302, wherein the number of enabler fields corresponds to the number of controlled breakpoint generating modules. It should be realized therefore that in a different embodiment the number of breakpoint generating modules controlled by a halt controlling register can vary. For example, in a different embodiment of the invention, one halt controlling register can be used for controlling the operation of only one breakpoint generating module. In this case it is possible to have more than one halt controlling register that respond to a single breakpoint message. Further more, in yet a different embodiment there can be more than one halt controlling register, wherein each halt controlling register controls a different number of breakpoint generating modules.

In addition, in the embodiment of FIG. 6, the halt controlling registers are in direct association or included in the halt signal generator 502 that is the single halt signal generator in the system. However, it should be realized that in yet a different embodiment, a halt signal generator 502 can be directly associated with or included in a breakpoint generating module. That is, a breakpoint generating module can include or be in direct association with one ore more halt controlling registers, wherein the breakpoint messages are conveyed directly to the breakpoint generating modules (i.e., directly to the halt signal generator 502 in association therewith). It is noted that a combination is also allowed, i.e., some breakpoint generating modules can be in direct association with their respective halt signal generator, while the operation of other breakpoint generating modules can be controlled by a common halt signal generator, as illustrated in FIGS. 5 and 6. Further more, it should be realized that one or more signal generators can be combined with one or more clock controllers to halt the operation (i.e., disable) of breakpoint generating modules in the system. Thus, realizing that a clock controller and a halt signal generator are two non-limiting examples of a halt controller, it should be appreciated that in a system providing mutual breakpoint capabilities there should be at least one halt controller.

Further more, a person versed in the art can appreciate that the breakpoint controller 202 too can be considered as a halt controller. The a core halt enabler field 433 can be considered as a halt controlling register or it can be associated with a halt controlling register while the controller breakpoint message 203 is the halt signal in this case. The breakpoint controller 202 can include a core signal generator that generates controller breakpoint messages. It should be realized that in alternative embodiments the breakpoint controller's circuit can be combined together with the halt controller's circuit as illustrated in FIGS. 4 and 6, for example.

Figure 7:
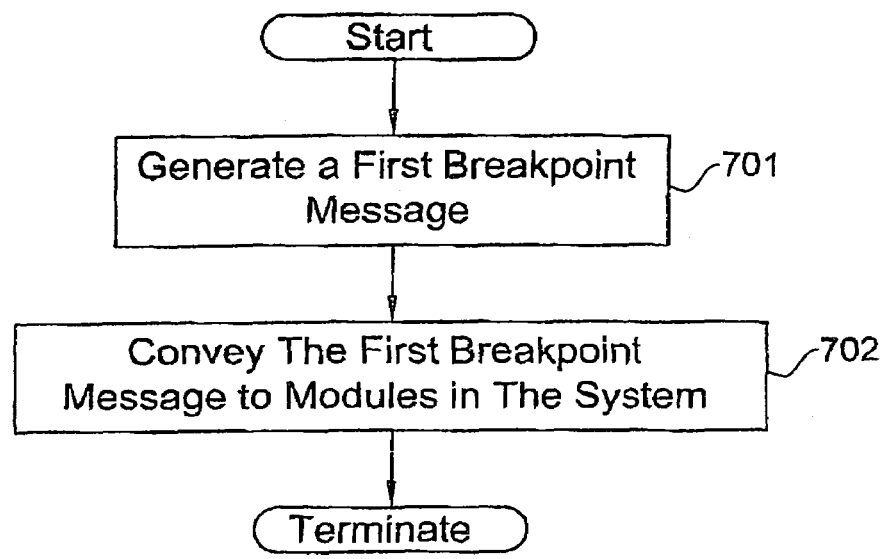
FIG. 7 is a flowchart illustrating a method for generating a first breakpoint message in a system providing mutual breakpoint capabilities, according to one embodiment of the invention.

Turning now to FIG. 7, which is a flow chart is a flowchart illustrating a method for generating a first breakpoint message in a system providing mutual breakpoint capabilities, according to one embodiment of the invention. After generating (701) a first breakpoint message in a breakpoint generating module, the breakpoint message is conveyed (702) to other modules in the system, such as the core processor 102, the halt controller (such as the halt signal generator 502, the clock controllers 205 and 304 the breakpoint controller 202) or even to breakpoint generating modules (possibly including the one where the first breakpoint message was generated). As was previously described with reference to FIGS. 2-6, examples to breakpoint generating modules are the DMA controller 103 and the timer 302, while examples to their respectively generated first breakpoint message are a DMA breakpoint messages 204 and a timer breakpoint message 303. Yet these examples are non-limiting and other types of a first breakpoint message as well as other breakpoint generating modules are also possible. The first breakpoint message is conveyed so as to allow halting the operation of one or more of the at least one breakpoint generating modules and the core processor.

Figure 8:
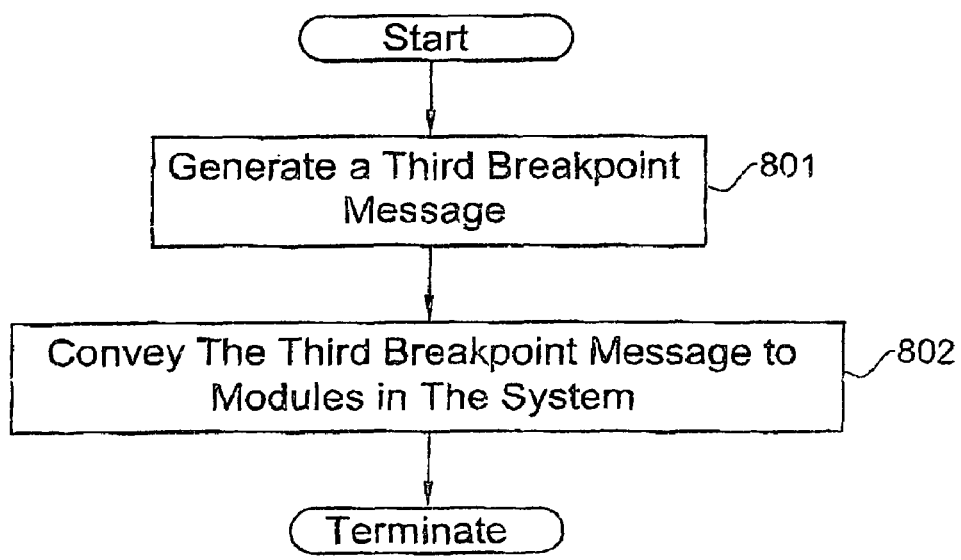
FIG. 8 is a flowchart illustrating a method for generating a core breakpoint message in a system providing mutual breakpoint capabilities, according to one embodiment of the invention.

It was previously explained that the core processor 102 can generate a core breakpoint message, referenced also as a "third breakpoint message", for allowing the operation of the at least one breakpoint generating modules and core processor to be halted. This is illustrated in FIG. 8 that is a flowchart illustrating a method for generating a core breakpoint message in a system providing mutual breakpoint capabilities, according to one embodiment of the invention.

After generating (801) a third breakpoint message in a breakpoint generating module, the breakpoint message is conveyed (802) to other modules in the system, such as the halt controller (such as the halt signal generator 502, the clock controllers 205 and 304 the breakpoint controller 202), directly to the breakpoint generating modules, or even the core processor 102 itself. As was previously described with reference to FIGS. 2-6, examples to breakpoint generating modules are the DMA controller 103 and the timer 302. Yet these examples are non-limiting and other breakpoint generating modules are also possible. The third breakpoint message is conveyed so as to allow halting the operation of one or more of the at least one breakpoint generating modules and/or the core processor.

Figure 9:
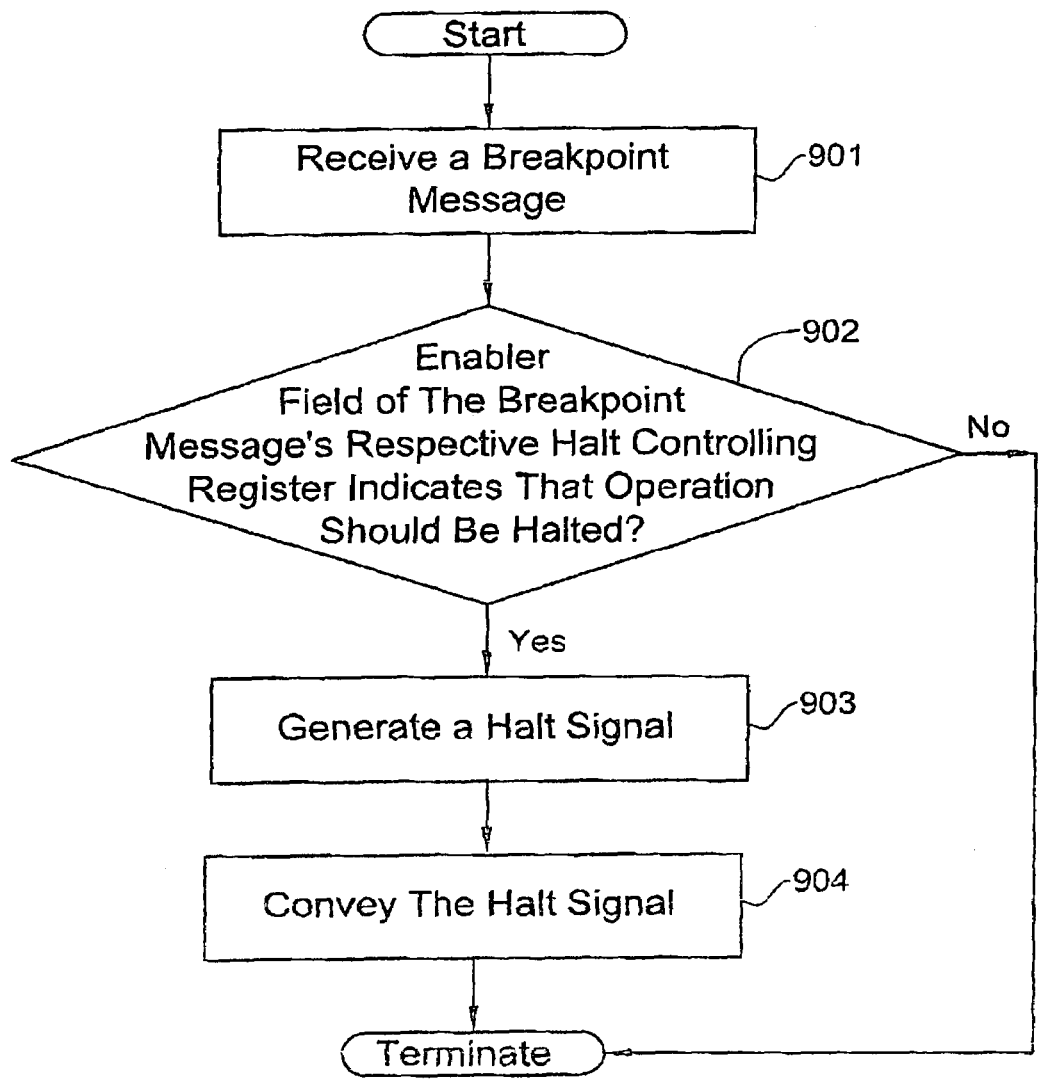
FIG. 9 is a flowchart illustrating a method for halting operation of at least one breakpoint generating module and a core processor in a system providing mutual breakpoint capabilities, according to one embodiment of the invention.

FIG. 9 is a flowchart illustrating a method for halting operation of at least one breakpoint generating module and a core processor in a system providing mutual breakpoint capabilities, according to one embodiment of the invention. After receiving a breakpoint message (901), or more specifically, after receiving a first or a third breakpoint message, if (902) an indication stored in any of the enabler fields (for example, 429, 430 or 433) of the breakpoint message's corresponding halt controlling register indicates that the operation of its respective module should be halted, a halt signal is generated (903) and is conveyed (904) in order to halt the operation of the breakpoint generating module or the operation of its respective core processor.

It should be noted that the received breakpoint message can be either a first or a third breakpoint message or a third or a third breakpoint message. In addition, it should be noted that in the exemplary embodiments provided above, the DMA halt enabler field 429, the timer halt enabler field 430 and the core enabler field 433 are examples of enabler fields. Further more, the modules are the DMA controller, the timer and the core processor respectively. Yet, this embodiment is non limiting and other breakpoint messages, other enabler fields and other modules are allowed as well.

It should be further noted that if the halt controller is a clock controller, the halt signal generated in 903 is conveyed (in 904) to the corresponding clock signal generator (e.g. the DMA clock signal generator 431 and a timer clock signal generator 432) that halt the operation of the breakpoint generating module or the core processor.

The invention claimed is:

1. A system for providing breakpoint capabilities to at least one breakpoint generating module and a core processor in a computing device, the system comprising:
- a first breakpoint generating module capable of generating a first breakpoint message for allowing operation of the first breakpoint generating module to be halted, and said first breakpoint message allowing generation of second breakpoint message which corresponds to said first breakpoint message; and
- a core processor operatively coupled to said first breakpoint generating module and being responsive to said second breakpoint message for allowing operation of said core processor to be halted and for generating a third breakpoint message which is associated with the halting of said core processor; and
- a second breakpoint generating module operatively coupled to said core processor and said second breakpoint generating module is responsive to said third breakpoint message for allowing operation of the second breakpoint generating module to be halted.

2. The system according to claim 1, wherein the second breakpoint message is received on said core processor, and wherein the halting of said core processor is a result of a self-contained process implemented by said core processor according to said second breakpoint message.

3. The system according to claim 2, wherein the halting of said core processor does not involve reading data from a program memory.

4. The system according to claim 1, wherein said first breakpoint generating module is adapted to generate the first breakpoint message based on a local process occurring on said first breakpoint generating module.

5. The system according to claim 4, wherein said first breakpoint generating module includes:
- a bus that is adapted to sample temporal data received thereon;
- a reference register for storing reference data thereon; and
- a matching comparator that is coupled to said bus and to said reference register, and said matching comparator is adapted to generate said first breakpoint message in case temporal data on said bus and data stored in said reference register meet a predefined matching condition.

6. The system according to claim 5, wherein said first breakpoint generating module further comprises an enabler field which is indicative of whether generating of a breakpoint message with respect to said first breakpoint generating module is currently enabled or not.

7. The system according to claim 1, further comprising a breakpoint controller that is coupled at least to said first breakpoint generating module and to said core processor, and said breakpoint controller is responsive to said first breakpoint message for generating said second breakpoint message.

8. The system according to claim 7, wherein said breakpoint controller is not a program memory and said first and second breakpoint messages are hardware signals.

9. The system according to claim 1, wherein said first breakpoint generating module is a DMA (Direct Memory Access) module and said first breakpoint message is a DMA breakpoint message.

10. The system according to claim 1, wherein said first breakpoint generating module is a timer module and said first breakpoint message is a timer breakpoint message.

11. The system according to claim 7, wherein said second breakpoint message is a controller breakpoint message.

12. The system according to claim 1, wherein said third breakpoint message is a core breakpoint acknowledge message.

13. The system according to claim 1, further comprising a breakpoint controller that is coupled at least to said core processor and to said second breakpoint generating module, and said breakpoint controller is responsive to said third breakpoint message for allowing operation of the second breakpoint generating module to be halted.

14. The system according to claim 13, wherein said breakpoint controller is a clock controller and said clock controller is responsive to said third breakpoint message for preventing clock signals from reaching said second breakpoint generating module, thereby allowing operation of the second breakpoint generating module to be halted.

15. A system for providing breakpoint capabilities to at least one breakpoint generating module and a core processor in a computing device, the system comprising:
- a core processor capable of generating a first breakpoint message for allowing operation of the core processor to be halted; and
- a first breakpoint generating module operatively coupled to said core processor, the first breakpoint generating module is responsive to said first breakpoint message for allowing operation of the first breakpoint generating module to be halted, and a second breakpoint message; and
- a second breakpoint generating module operatively coupled to said first breakpoint generating module, said second breakpoint generating module is responsive to said second breakpoint message for allowing operation of the second breakpoint generating module to be halted.

16. The system according to claim 15, wherein the halting of said first breakpoint generating module is a self-contained process implemented by said first breakpoint generating module according to said first breakpoint message.

17. The system according to claim 16, wherein the halting of said first breakpoint generating module does not involve reading data from a program memory.

18. The system according to claim 17, further comprising a breakpoint controller that is coupled at least to said core processor and to said first breakpoint generating module, and said breakpoint controller is responsive to said first breakpoint message for generating a third breakpoint message for allowing operation of the first breakpoint generating module to be halted.

19. The system according to claim 18, wherein said breakpoint controller is not a program memory and said first and third breakpoint messages are hardware signals.

20. The system according to claim 15, wherein said first breakpoint generating module is a DMA (Direct Memory Access) module and said second breakpoint message is a DMA breakpoint message.

21. The system according to claim 15, wherein said first breakpoint generating module is a timer module and said second breakpoint message is a timer breakpoint message.

22. The system according to claim 18, wherein said third breakpoint message is a controller breakpoint message.

23. The system according to claim 15, wherein said first breakpoint message is a core breakpoint acknowledge message.

24. The system according to claim 15, further comprising a breakpoint controller that is coupled at least to said first and second breakpoint generating modules, and said breakpoint controller is responsive to said second breakpoint message for allowing operation of the second breakpoint generating module to be halted.

25. The system according to claim 24, wherein said breakpoint controller is a clock controller and said clock controller is responsive to said second breakpoint message for preventing clock signals from reaching said second breakpoint generating module, thereby allowing operation of the second breakpoint generating module to be halted.

26. A system for providing breakpoint capabilities to at least one breakpoint generating module and a core processor in a computing device, the system comprising:
- a core processor capable of generating a core breakpoint acknowledge message acknowledging said core processor halting in response to a breakpoint message;
- a first breakpoint generating module capable of generating a first breakpoint message for allowing operation of the first breakpoint generating module to be halted;
- a breakpoint controller operatively coupled to said first breakpoint generating module and to said core processor, said breakpoint controller is responsive to the first breakpoint message for generating a second breakpoint message and for conveying the second breakpoint message directly to said core processor, for allowing operation of the core processor to be halted, and
- said breakpoint controller is responsive to said core breakpoint acknowledge message for conveying said core breakpoint acknowledge message directly to said first breakpoint generating module, for allowing operation of said first breakpoint generating module to be halted.

27. The system according to claim 26, wherein the second breakpoint message is received on said core processor, and wherein the halting of said core processor is a result of a self-contained process implemented by said core processor according to said second breakpoint message.

28. The system according to claim 27, wherein the halting of said core processor does not involve reading data from a program memory.

29. The system according to claim 26, wherein said first breakpoint generating module is adapted to generate the first breakpoint message based on a local process occurring on said first breakpoint generating module.

30. The system according to claim 29, wherein said first breakpoint generating module includes:
- a bus that is adapted to sample temporal data received thereon;
- a reference register for storing reference data thereon; and
- a matching comparator that is coupled to said bus and to said reference register, and said matching comparator is adapted to generate said first breakpoint message in case temporal data on said bus and data stored in said reference register meet a predefined matching condition.

31. The system according to claim 26, wherein said breakpoint controller is not a program memory and said first and second breakpoint messages are hardware signals.

32. The system according to claim 26, wherein said first breakpoint generating module is a DMA (Direct Memory Access) module and said first breakpoint message is a DMA breakpoint message.

33. The system according to claim 26, wherein said first breakpoint generating module is a timer module and said first breakpoint message is a timer breakpoint message.

34. The system according to claim 26, wherein said second breakpoint message is a controller breakpoint message.

* * * * *